G. MOORE.
WATER PURIFIER.
APPLICATION FILED OCT. 31, 1914.

1,271,925.

Patented July 9, 1918.
2 SHEETS—SHEET 1.

Witnesses
E. H. Wagner.
M. Delaney.

Inventor
George Moore

By Edgar M. Kitchin
Attorney

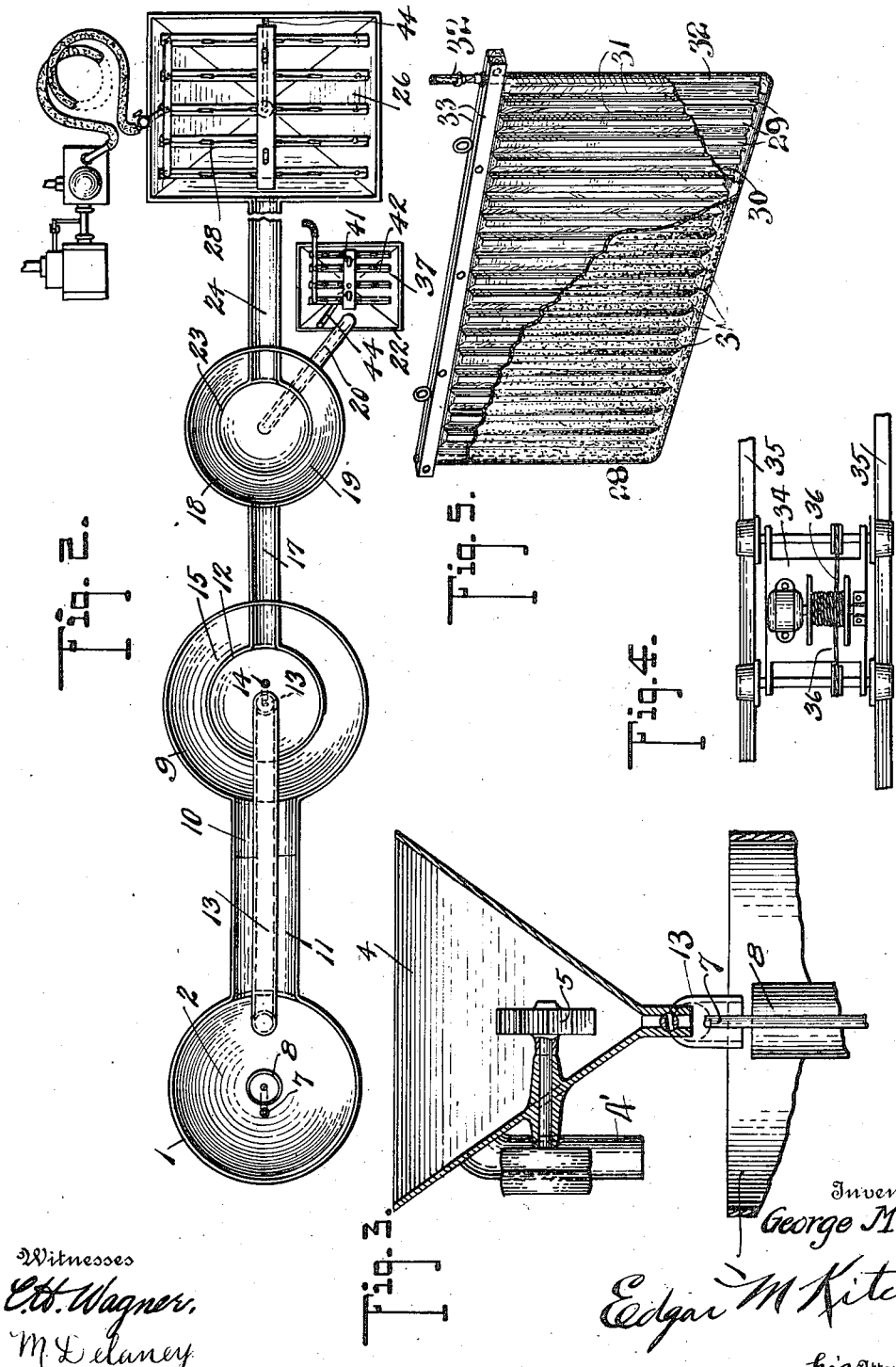

UNITED STATES PATENT OFFICE.

GEORGE MOORE, OF JOPLIN, MISSOURI, ASSIGNOR TO THE CHEMICAL PROCESS COMPANY, OF NEW YORK, N. Y., A CORPORATION OF NEW YORK.

WATER-PURIFIER.

1,271,925.  Specification of Letters Patent.  Patented July 9, 1918.

Application filed October 31, 1914. Serial No. 869,547.

*To all whom it may concern:*

Be it known that I, GEORGE MOORE, a citizen of the United States, residing at Joplin, in the county of Jasper and State of Missouri, have invented certain new and useful Improvements in Water-Purifiers; and I do hereby declare the following to be a full, clear, and exact description of the invention, such as will enable others skilled in the art to which it appertains to make and use the same.

This invention relates to the art of sewage treatment and more particularly to apparatus for facilitating the concentration of the solids and the separation of such solids from the liquid.

An object in view is the practically complete removal of solids from sewage for discharging a clear effluent free from harmful substances.

With this and other objects in view, as will in part be hereinafter stated and in part become apparent, the invention comprises certain novel constructions, combinations, and arrangements of parts as will be subsequently specified and claimed.

In the accompanying drawing:

Fig. 2 is a top plan view thereof.

Fig. 3 is an enlarged, detail fragmentary vertical section through the supply hopper.

Fig. 4 is a top plan of the crane.

Fig. 5 is an enlarged perspective view of one of the filter leaves detached, parts being broken away.

Figure 1:
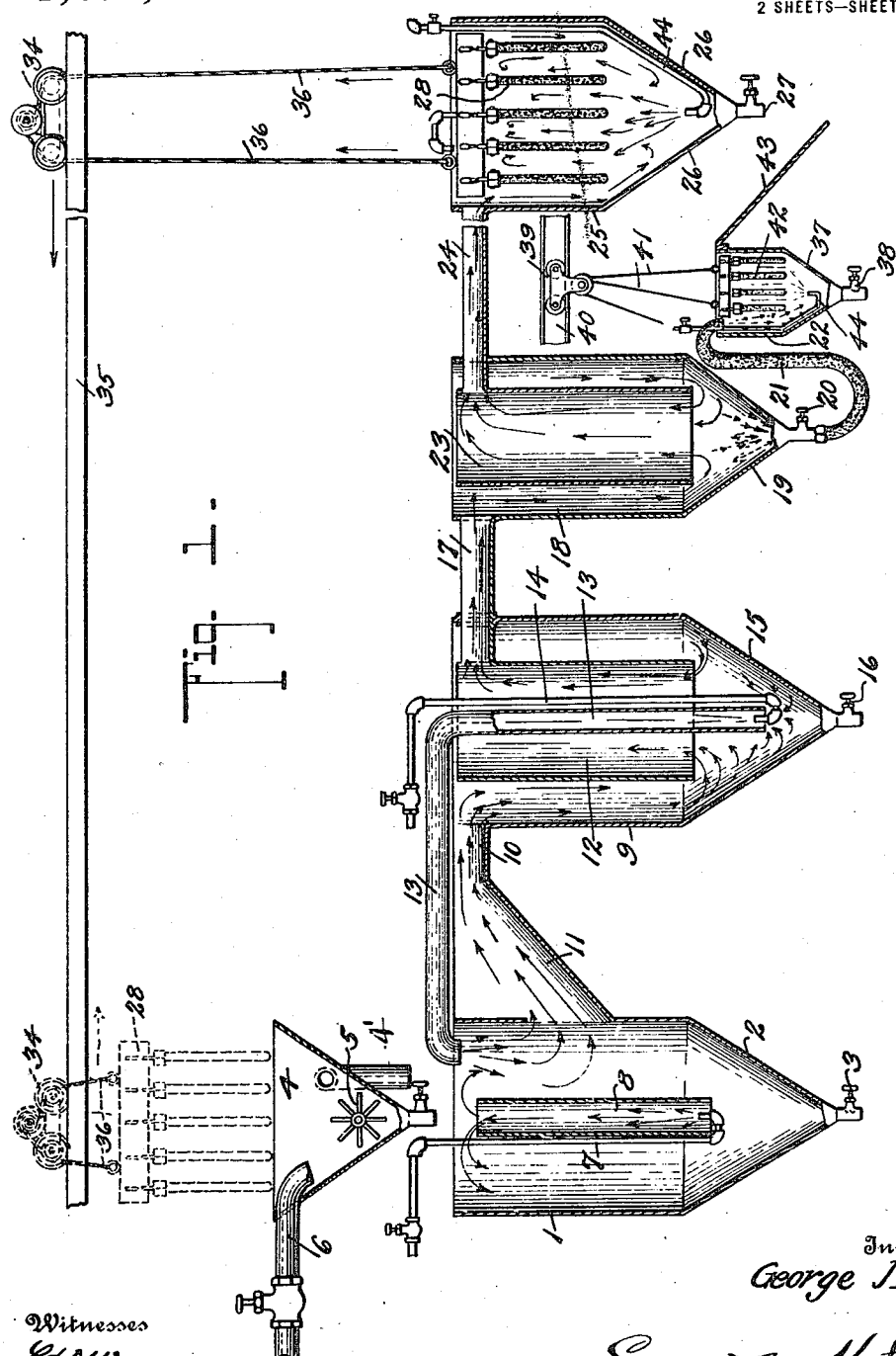
Figure 1 is a view partly in side elevation and partly in vertical section of an apparatus embodying the invention.

Referring to the drawing by numerals, 1 indicates an agitator tank having preferably a conical bottom 2, valved at 3 for facilitating cleaning of the tank when desired. A feed hopper 4 discharges into tank 1 and contains a disintegrator 5, consisting of a rotating shaft bearing blades for breaking up sludge, the shaft being rotated by power supplied from any appropriate source not illustrated. Sewage supply pipe or trough 6 discharge into hopper 4. An air jet 7 or other means of agitation is provided for tank 1, and preferably discharges upwardly in a centrally disposed pipe 8 for maintaining circulation and thus insuring effective agitation. Jet 7 is supplied with compressed air or other pressure fluid through a pipe leading from any appropriate source not shown.

A thickening tank 9 is arranged at one side of tank 1, and a trough 10 leads from tank 1 to tank 9, the trough 10 having a hopper-like enlargement 11 opening into tank 1 and having a bottom inclined toward tank 1. An open-end quieting drum 12 is arranged within and concentric to and spaced from the walls of tank 9, and a sludge discharge pipe 13 is preferably arranged substantially centrally within drum 12 and extends from approximately the apex of the conical bottom 15 of tank 9 upwardly to a point above drum 12 and is thence bent and extended across to and discharges into tank 1. An air jet 14 serves as a lift to force thickened solids, commonly known as sludge, through pipe 13 back into tank 1. A valve 16 controls discharge from the bottom of tank 9 for enabling cleaning of the tank when desired.

A pipe or trough 17 leads from the upper end of drum 12 to a separator tank 18 having conical bottom 19 and valved at 20 for controlling discharge of sludge through a pipe 21 to a sludge tank 22. Pipe 21 is preferably flexible or otherwise adjustable for enabling easy control of the location of its discharge end.

A drum 23 is arranged within and concentric to the walls of tank 18, and a pipe or trough 24 communicates with drum 23 and extends to and discharges into filter tank 25, having the hopper bottom 26 valved at 27 for enabling cleaning and draining.

Removably arranged in tank 25 is a filter 28 of the Moore filter leaf type, wherein a plurality of leaves discharge through a common header, and each consists, as seen in Fig. 5 of a series of rods or strips of wood or other bars 29 having canvas or other appropriate fabric 30 stretched on the opposite sides of the bars and connected together between the bars by rows of stitching 31, the fabric also inclosing the discharge pipe 32 which extends about the lower and two end edges of the leaf and forms the frame thereof in conjunction with the stiffening, preferably wooden beams 33, 33 extending along the upper edge of the leaf and clamping the upper free edges of the fabric 30 together. The upper end portions of pipe 32 extend through beams 33, and one end serves as the discharge for the leaf, being connected with the header above mentioned which latter is connected with the suction pump in the ordinary manner of a Moore filter.

A crane 34 rides on tracks 35 extending above tanks 25, 18, 9 and 1, and cables 36 connect filter 28 with crane 34 for facilitating elevation of the filter above the tanks and movement thereof to a position above hopper 4 for discharging the collected cakes from filter 28 into the hopper and thence into tank 1.

Tank 22 has hopper bottom 37 valved at 38 to facilitate cleaning. A crane 39 is mounted on track 40 and connected by cables 41 with a filter 42 in tank 22, the filter 42 being a duplicate of filter 28 but usually on a much reduced scale. Crane 39 is adapted to elevate filter 42 and move the same to a point for discharging on to chute 43 which leads to a briquet machine or other appropriate point of disposal. Agitating air supply pipes 44 are arranged in tanks 25 and 22 to prevent settling of solids in the bottoms of said tanks.

In operation, tanks 1, 9 and 18 are filled with sewage. Foreign solids such as coal dust or the like, are introduced into tank 1. The supply of sewage through trough 6 being maintained, and air being supplied to pipes 7, 14 and 44, the agitated sewage with foreign solids are caused to flow from tank 1 to tank 9 and there certain of the solids settle to the bottom of the tank and are picked up and returned to tank 1 through pipe 13, while the lighter solids and liquid flow through conduit 17 to tank 18 where the solids are allowed to settle to the bottom. Drum 12 largely prevents agitation within tank 9 outside of drum 12, so as to avoid discharge into conduit 17 due to agitation, and drum 23 largely prevents agitation therein incident to the inflow to tank 18 through conduit 17. Thus only the most buoyant solids find their way into tank 25, the balance being disposed of through pipe 21 into sludge tank 22. The heavier solids fall to the bottom of tank 18 and are drawn off through pipe 21 into the sludge tank. In this way filter 28 is not clogged by an excessive mass of solids but is left free for prolonged and rapid operation before requiring cleaning. The solids, finding their way into tank 25, are, however, so fine and adhesive that special provision is preferably made to prevent their collecting against the fabric of the filter, since when so collected they are very difficult to remove, whereas by applying a coating of coal dust, charcoal or like easily removed material on the fabric first and then filtering the effluent entering tank 25, the fine, sticky solids collect on the outer surface of the filter coats or beds and in no way interfere with the cleaning of the filter. Liquid is sucked or drawn by an appropriate aspirator, such as a hydraulic pump, through the filter beds, the fabric and discharge pipes and finally through the discharge header to the pump and thence discharged as a perfectly clear effluent. This is continued until the sewage solids coating on the filter coats of filter 28 sufficiently obstruct the inflow of liquid as to render filtration slow. Thereupon, filter 28 is lifted from tank 25, moved over hopper 4, and the cakes or filter beds discharged from the filter leaves. To insure holding of these cakes on the filter leaves during transit, the connection with the aspirator is maintained, and when the filter is in position for discharge, it is usually sufficient to relieve the suction and admit air to the interior of the filter leaves whereupon the cakes or filter beds fall off and leave the filter fabric perfectly clean. In instances where the cakes fail to readily fall from the leaves, a reverse current, preferably of compressed air, is introduced through the header of the filter into the interior of the leaves.

The filter 28 then again has its leaves supplied with filter bed coatings preferably applied by introducing the filter into a tank of slimes, such as would be obtained by discharging all sewage from tank 25 and filling the tank with water and then mixing coal dust or charcoal or the like in the water until the requisite consistency of slimes is produced, and then starting the aspirator for sucking water from the tank through the several filter leaves and building thereon cakes or filter bed coats formed of the coal dust or other solids of the slimes. The fluid mass is constantly agitated during the building of the cakes or coatings as by an air jet or jets in the bottom or lower part of the tank. This method of coating the leaves is preferable because of its ease and speed, and also because one essential feature in the formation of the filter bed coating is that they should be uniform in consistency and uniform in their resistance at all points to the advance of filtrate therethrough. The coats deposited as described respond fully to this requirement since in the course of formation if a weak spot occurs, that is a point where the inflow is more easy than at any other point, the flow will be quickened at this point of easy inflow and the solids of the slimes will quickly fill in the weak spot and render it uniform in resistance with all other points, so that the resulting filter cakes or beds offer substantially uniform permeability throughout.

The leaves of filter 28 being thus coated, the filter is lowered into tank 25 or if that tank has been employed in the coating operation the filter is already in the tank, and the supply of effluent through conduit 24 is started and the filtration of the effluent continued as before. The supply is controlled from the source, not illustrated, to conduit 6, which is cut off while filter 28 is out of tank 25 and while being supplied with fresh filter bed coatings.

Ordinarily the foreign solids discharged from filter 28 into hopper 4 and thence into tank 1 are sufficient for all operative purposes and for compensating for removals of such solids with the sludge in tank 22, but if from any reason it appears at any time that additional foreign solids are desirable such solids are directly added by being deposited in tank 1.

The manipulations of filter 42 are effected the same as filter 28 except that ordinarily there is an ample supply of foreign solids in the sludge to cause the cakes formed on the filter leaves to be readily discharged. If in working any sewage it becomes apparent that the cakes are not freeing themselves from the leaves of filter 42, said leaves will of course be supplied with coatings of foreign solids before filtration of sludge.

Obviously one of the most important objects to be attained in the handling of sewage is its rapid treatment without sacrifice of efficiency, and to this end the tank 1 is always supplied with the thickest solids from the sewage which, being returned from tank 9 and containing both coagulated sewage solids and foreign solids aids in causing coagulation of the sewage solids of incoming sewage, so that the product finally discharged through conduit 17 contains solids conditioned for more rapid settling and coagulation in tank 18 than could have been secured had not the sewage been subjected to intimate contact with other sewage solids and foreign solids such as occurs during agitation in tank 1.

The art of treating sewage is not claimed herein as the invention involving such art has been made the subject matter of my copending application Serial No. 869,548, filed October 31, 1914.

What I claim is:—

1. In combination, a container, means for agitating sewage therein, a thickening container communicating with the first mentioned container for receiving sewage therefrom, means for returning the thickened portions of sewage from the second container to the first, and means for removing solids from effluent discharged from the second container.

2. In combination, a container, means for agitating sewage therein, a container communicating with the first container and adapted to allow settling of solids entering from the first container, and means for discharging thickened materials from the lower portion of the second container directly back into the first container.

3. In combination, a container, means for agitating sewage therein, a container communicating with the first container and adapted to allow settling of solids entering from the first container, means for discharging thickened materials from the lower portion of the second container directly back into the first container, a third container communicating with the upper portion of the second container and adapted to receive fluid and solids in suspension therefrom, and means for separately treating products discharged from the upper and lower portions of the third container.

4. In combination, a container, means for agitating sewage therein, a container communicating with the first container and adapted to allow settling of solids entering from the first container, means for discharging thickened materials from the lower portion of the second container directly back into the first container, a third container communicating with the upper portion of the second container and adapted to receive fluid and solids in suspension therefrom, and means for separately filtering products discharged from the upper and lower portions of the third container.

5. In combination, a series of containers communicating successively, means for agitating sewage in the first, means for returning solids from the second to the first and means for separately treating the thin liquid and the thick mass of the third container for separating the fluid from the solids.

6. In combination, an agitating tank, a settling tank communicating with the agitating tank, means for returning solids settling in the settling tank to the agitating tank, a separating tank communicating with the upper portion of the settling tank, and means for delivering thickened fluid from the lower portion and thin fluid from the upper portion of the separating tank for separate treatment.

7. In sewage treatment apparatus, the combination of a container, a second container adjacent to first container, a conduit affording communication between the upper portion of the first container and the upper portion of the second container, said conduit having a hopper like inclined portion extending from a point adjacent the second container to the lower portion of the first container, means for returning sludge from the lower portion of the second container to the first container, and means for separating the fluid from the solids of the effluent from the second container.

8. In sewage treatment apparatus, the combination of an agitating tank, a separating tank communicating therewith, means for disposing of sludge from the separating tank, a tank for receiving the effluent from the separating tank, a filter for separating solids from liquid in the last named tank, and means for returning the solids separated from the effluent to the agitating tank.

9. In sewage treatment apparatus, the combination of an agitating tank, a hopper discharging into said tank, means for delivering sewage to the hopper, a disintegrator in the hopper, a tank for receiving effluent from the agitating tank, a filter for separating liquid from solids in the last named tank, and means for delivering solids collected on the filter into the hopper.

10. In sewage treatment apparatus, the combination of an agitating tank, means for delivering the sewage thereto, means for agitating the contents of the tank, a thickening tank communicating with the agitating tank, means for returning solids from the thickening tank to the agitating tank, a tank receiving the effluent from the thickening tank, a filter for separating the liquid and solids in the last named tank, and means for returning the thus separated solids to the agitating tank.

In testimony whereof I affix my signature in presence of two witnesses.

GEORGE MOORE.

Witnesses:
R. M. PARKER,
EDGAR M. KITCHEN.